(12) United States Patent
Clendinning

(10) Patent No.: US 10,302,488 B2
(45) Date of Patent: May 28, 2019

(54) OPTICAL SLIT FOR A SPECTROMETER THAT INCORPORATES A WAVELENGTH CALIBRATION LIGHT SOURCE

(71) Applicant: Ocean Optics, Inc., Largo, FL (US)

(72) Inventor: Kirk Clendinning, Winter Springs, FL (US)

(73) Assignee: Ocean Optics, Inc., Largo, FL (US)

( * ) Notice: Subject to any disclaimer, the term of this patent is extended or adjusted under 35 U.S.C. 154(b) by 0 days.

(21) Appl. No.: 15/982,296

(22) Filed: May 17, 2018

(65) Prior Publication Data

US 2018/0340824 A1    Nov. 29, 2018

Related U.S. Application Data

(60) Provisional application No. 62/510,445, filed on May 24, 2017.

(51) Int. Cl.

| | |
|---|---|
| *G01J 3/28* | (2006.01) |
| *G01J 3/04* | (2006.01) |
| *G01J 3/02* | (2006.01) |
| *G01J 3/14* | (2006.01) |
| *G02B 6/26* | (2006.01) |

(52) U.S. Cl.
CPC ............... *G01J 3/04* (2013.01); *G01J 3/021* (2013.01); *G01J 3/0208* (2013.01); *G01J 3/0221* (2013.01); *G01J 3/14* (2013.01); *G01J 3/28* (2013.01); *G02B 6/26* (2013.01)

(58) Field of Classification Search
CPC .... G01J 3/02; G01J 3/28; G01J 3/2803; G01J 3/10; G01J 3/2823
USPC ......................................................... 356/326
See application file for complete search history.

(56) References Cited

U.S. PATENT DOCUMENTS

| | | | |
|---|---|---|---|
| 2005/0046850 A1* | 3/2005 | Chow ................ | G01B 11/0625 356/430 |
| 2009/0103081 A1* | 4/2009 | Whelan ..................... | G01J 3/28 356/243.1 |

* cited by examiner

*Primary Examiner* — Md M Rahman
(74) *Attorney, Agent, or Firm* — Dennis L. Cook, Esq.

(57) ABSTRACT

An optical slit device that combines microelectromechanical design techniques, semiconductor laser technology, and micro-optics to provide a spectrometer entrance slit on a semiconductor substrate with integrated calibration light sources, which integrated light enters the entrance slit and is transmitted down the same optical path as a light source under test and by which the spectrometer can be wavelength calibrated in situ is disclosed.

2 Claims, 3 Drawing Sheets

OPTICAL SLIT FOR A SPECTROMETER THAT INCORPORATES A WAVELENGTH CALIBRATION LIGHT SOURCE

CROSS-REFERENCE TO RELATED APPLICATION

The present application claims the benefit of previously filed Provisional Patent Application Ser. No. 62/510,445, filed on May 24, 2017.

FIELD OF THE INVENTION

The device of this disclosure belongs to the field of calibration light sources. More specifically the invention relates to an entrance optical slit device of a spectrometer, which integrates light sources to provide spectral lines by which the instrument can be wavelength calibrated in situ.

BACKGROUND OF THE INVENTION

A linear array sensor spectrometer is used to measure the irradiance of a light source at a range of wavelengths simultaneously. The slit aperture at the optical port is used to control the amount of light entering the system, which affects the collimation and thus instrument resolution. The slit is an integral part of the Czerny-Turner optical bench among others. Slits are usually fabricated using electrical discharge machining of metals, however using microelectromechanical techniques, semiconductor materials, such as silicon nitride, can also be exploited.

The optical mechanical components of a spectrometer are susceptible to misalignment due to shock and vibration as well as thermal and other physical effects, which causes the wavelengths associated with specific sensor elements to shift. In applications where the absolute wavelength or relationship between wavelengths is critical, calibration must be performed or confirmed often. In current practice, a wavelength calibration light source with a multiplicity of spectral lines is either multiplexed into the light path or, connected to the optical port of the spectrometer. Given spectral lines that cover the wavelengths of the spectrometer, a polynomial regression can be used to describe the physical relationship of the detector elements to specific wavelengths of light. Thus, a method for in situ wavelength calibration, without adding additional optical components such as a fiber or integrating sphere would be highly advantageous.

BRIEF SUMMARY OF THE INVENTION

This invention provides an optical slit device with an integrated wavelength calibration light source for in situ wavelength calibration, which is suitable for mass production and thus competitively priced.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

Figure 1:
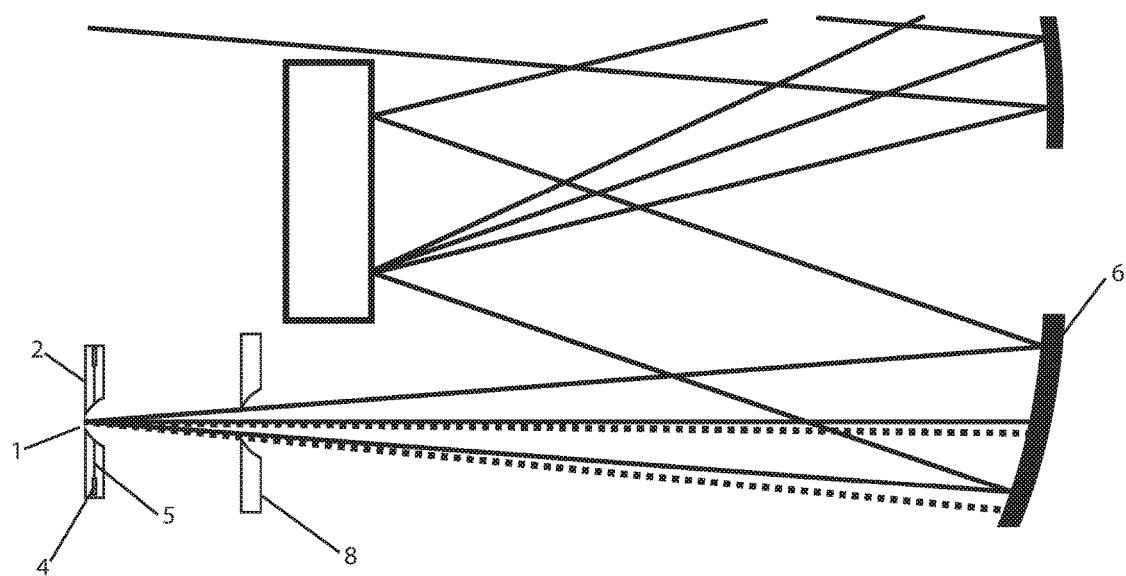
FIG. 1 shows a partial spectrometer layout with the disclosed optical slit device.

The invention achieves the aforementioned purpose by combining microelectromechanical design techniques, semiconductor laser technology, and micro-optics to provide a spectrometer entrance slit (1) on a semiconductor substrate (2) with integrated calibration light sources (3), which integrated light enters the entrance slit (1) and is transmitted down the same optical path as a light source under test (7) as shown in FIG. 1.

Figure 2:
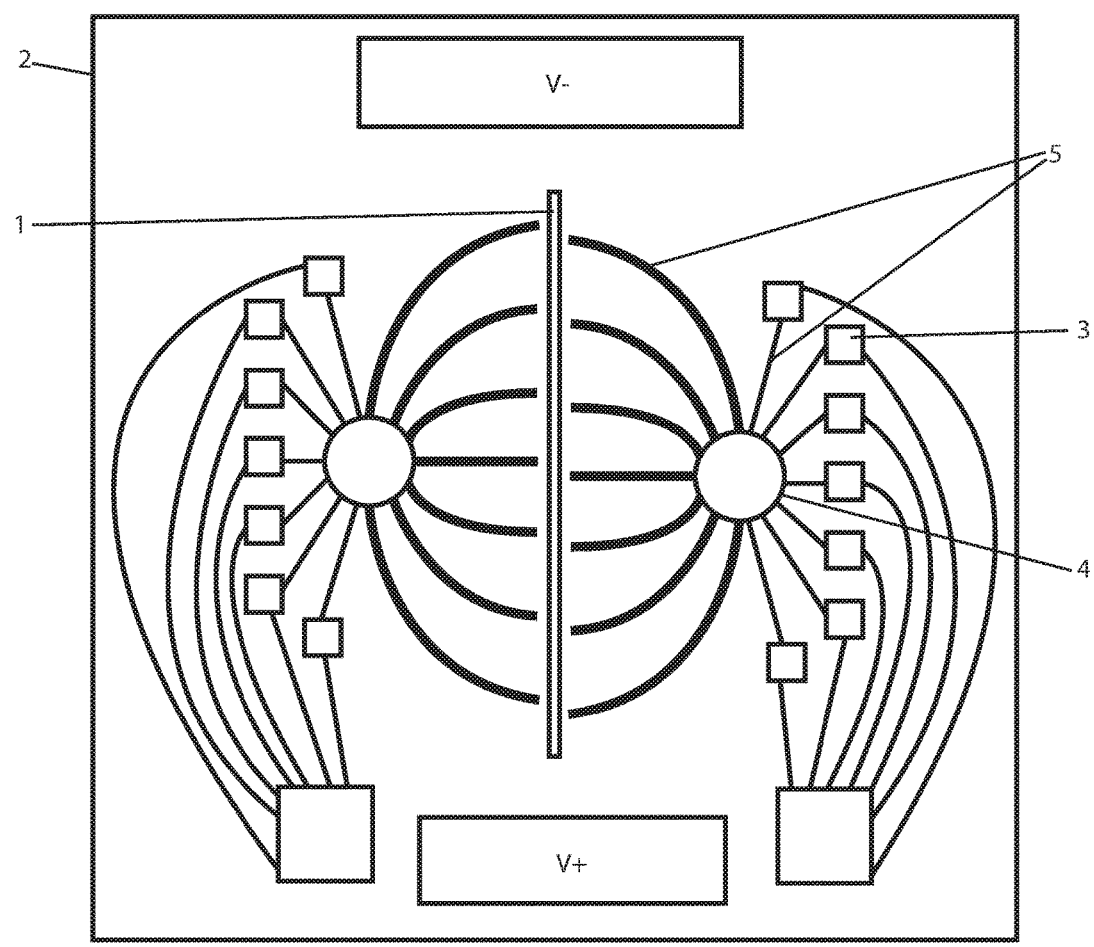
FIG. 2 shows a planer view of the disclosed optical slit device.
Figure 3:
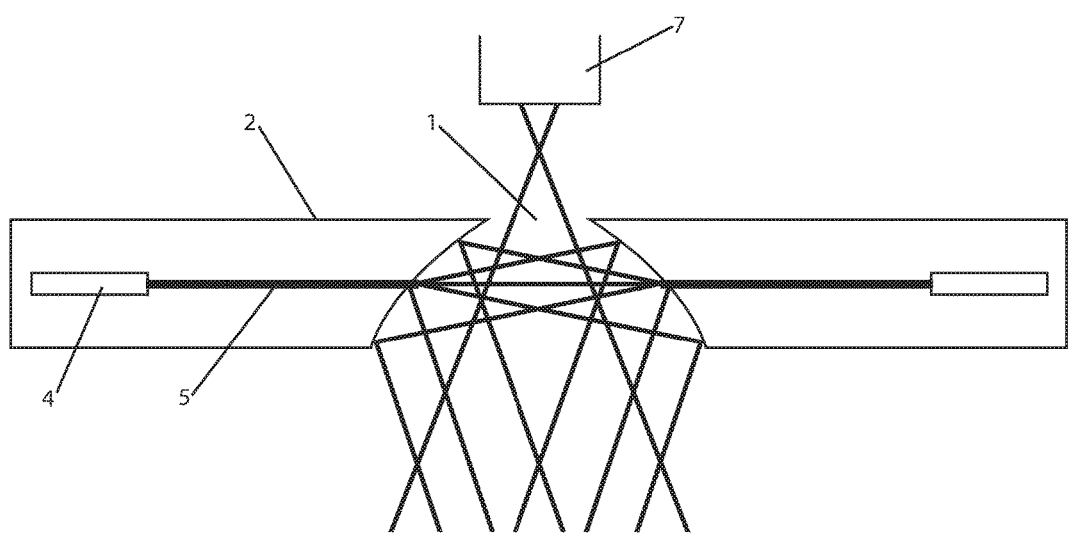
FIG. 3 shows a cross section view of the disclosed optical slit device.

As shown in more detail in FIGS. 2 and 3 a multiplicity of calibration light sources' (3) light is combined in integrating spaces (4) that are formed in the semiconductor substrate (2). Light from a multiplicity of semiconductor lasers or LEDs (3) with narrow bandpass filters (not shown) placed in their optical path, is led by channels (5) in the semiconductor substrate (2) material to integrating spaces (4). One or more calibration light exit channels (5) are connected to the entrance slit (1) in such a way that their light is projected in the same path as the light coming through the entrance slit (1). Appropriately sizing the exit of the calibration light exit channels (5) limits their cone of transmission to the reflecting surface of the entrance slit (1). The reflective face of the entrance slit (1) that is facing the spectrometer optical bench is shaped to guide the calibration light from the calibration light source (3) across the mirror (6). Multiple light channels (5) spread the light across the whole entrance slit (1). This could also be done on the shorter top and bottom faces of the entrance slit (1) to reduce the number of optical light channels (5) however, the beam angle would be more difficult to control. Light channels (5) are varied in diameter to equalize the irradiance in the entrance slit (1) as is known by those skilled in the art. Depending upon scatter of the calibration light from the calibration light sources (3) against the entrance slit's (1) shaped reflective surfaces, it can be helpful to add a second aperture (8), as shown in FIG. 1, to limit light scatter.

Referring now to FIGS. 2 and 3 the preferred embodiment of the system disclosed uses a silicon nitride entrance slit (1) which could also double as the semiconductor substrate (2) for a laser diode (3) semiconductor. Other semiconductor material could be used as is known to those skilled in the art but silicon nitride is used in the preferred embodiment as it has been cited as being a good foundation for making a semiconductor produced optical entrance slit (1). Laser diodes (3) are embedded in the semiconductor substrate (2) and their emitted light is guided by channels (5) in the silicon and mixed by integrating spaces (4) within the silicon, then aimed through additional light channels (5) to the edge of the entrance slit (1) to be reflected into the light beam. Note that the resultant light would be a mixture of spectral lines. The light is projected onto the inside face of the entrance slit (1), then into the light path through the spectrometer optical bench.

More specifically FIG. 2 is an illustration of what the silicon substrate (2) looks like. The light channels (5) paths and diameters are optimized to reduce loss. They are drawn in FIG. 2 as arcs for simplicity.

More specifically FIG. 3 is a cross section drawing showing how the light channels (5) carry the light into the entrance slit (1) to be reflected down the same optical path through the spectrometer optical bench as the light under test (7). The angles are not correct, but instead are drawn to illustrate the point.

Since certain changes may be made in the above described optical slit device with an integrated wavelength calibration light source for in situ wavelength calibration without departing from the scope of the invention herein involved, it is intended that all matter contained in the description thereof or shown in the accompanying figures shall be interpreted as illustrative and not in a limiting sense.

What is claimed is:

1. An optical slit device for a spectrometer comprising:
   a semiconductor substrate;
   an entrance optical slit cut into said semiconductor substrate said semiconductor substrate containing one or more calibration light sources;
   said calibration light sources positioned in such semiconductor substrate such that calibration light emitted from said calibration light sources enters said entrance optical slit and is reflected by said entrance optical slit and is then projected into and down an optical path contained in said spectrometer in the same manner as light coming through said entrance optical slit from a light source under test;
   said one or more calibration light sources' said calibration light being combined in integrating spaces located in said semiconductor substrate;
   wherein said calibration light is led by exit channels in said semiconductor substrate to said integrating spaces;
   wherein the size of each of said calibration light exit channels limits said calibration light exit channels' cone of transmission to a reflecting surface of said entrance slit;
   wherein a side of said entrance slit that is facing said spectrometer's said optical path is shaped to guide said calibration light across a mirror in said spectrometer; and,
   said one or more exit light channels spread said calibration light across the whole of said entrance slit and said exit light channels are varied in diameter to equalize the irradiance in said entrance slit.

2. The optical slit device for a spectrometer of claim 1 further comprising:
   said one or more calibration light sources being semiconductor lasers or Light Emitting Diodes with narrow bandpass filters located in said semiconductor substrate and placed in front of said calibration light sources.

* * * * *